Figure 1:
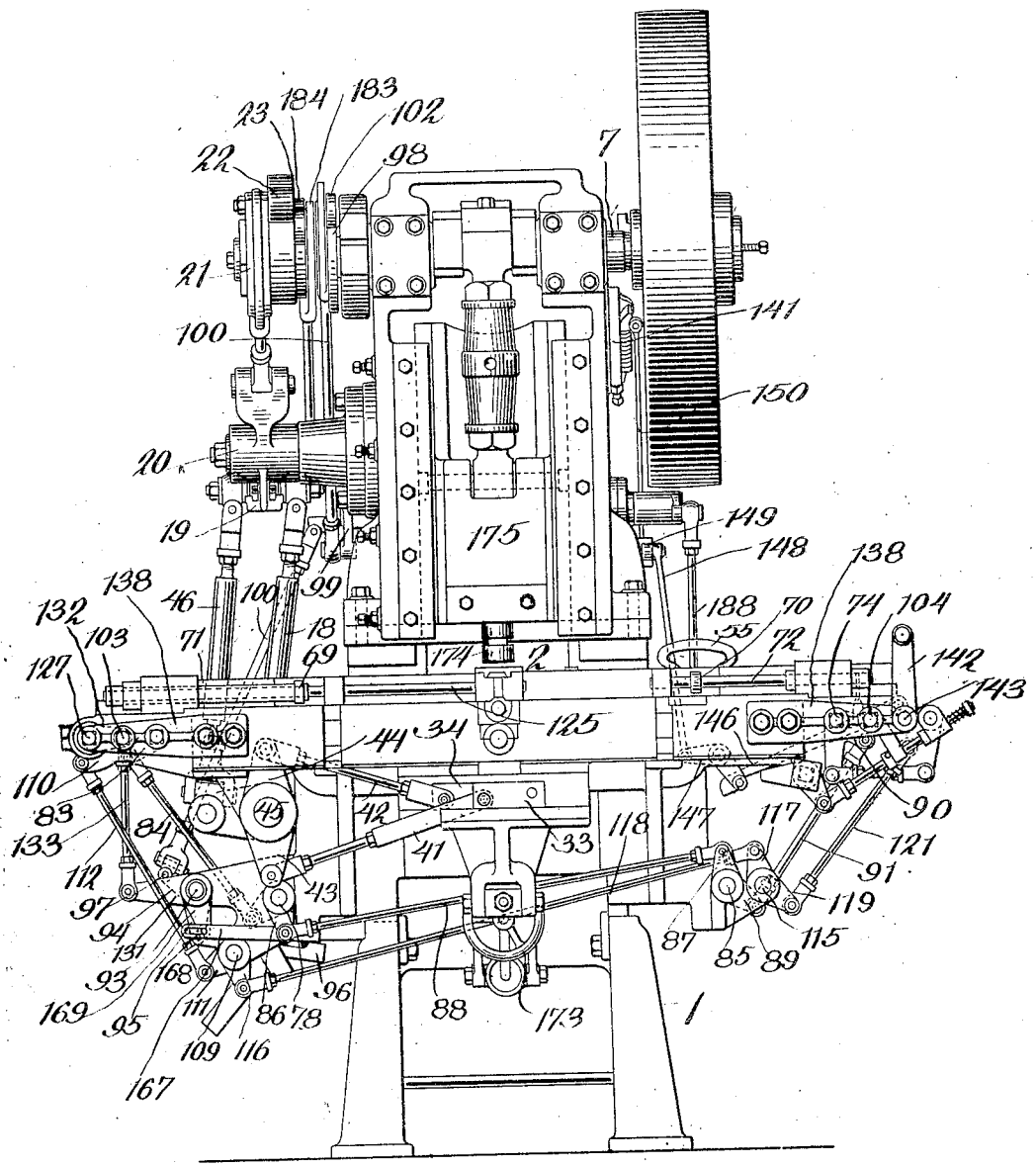

No. 829,250. PATENTED AUG. 21, 1906.
O. S. BEYER.
WORK FEEDING PUNCHING MACHINE.
APPLICATION FILED SEPT. 24, 1903.

13 SHEETS—SHEET 2.

Witnesses:

Inventor:
Otto S. Beyer
by Beeken & Spaulding
his attorneys

No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 3.
Fig. 3
Fig. 4
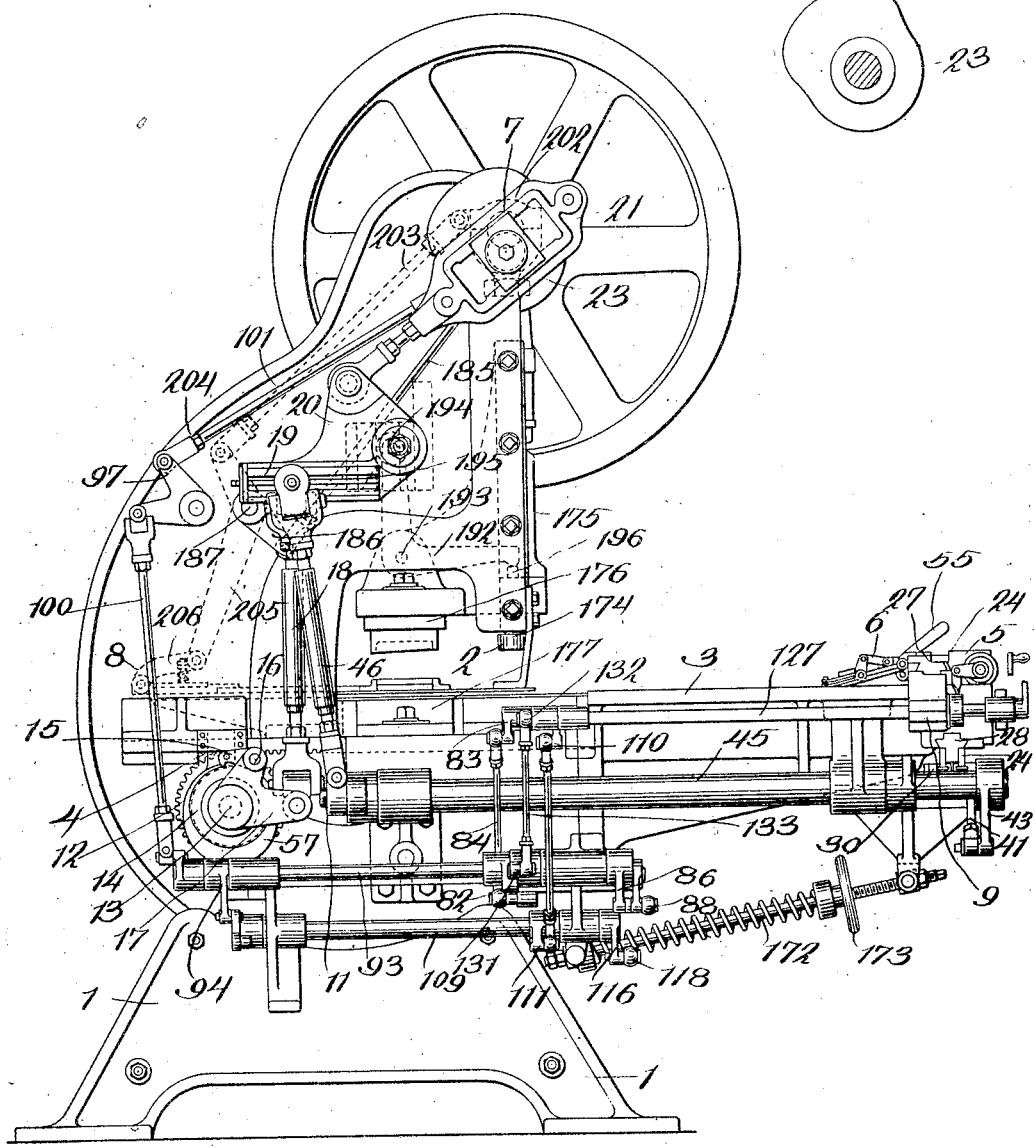
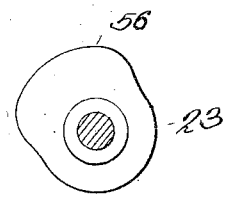
Witnesses:
Inventor:
Otto S. Beyer
by Beeken & Spaulding
his attorneys

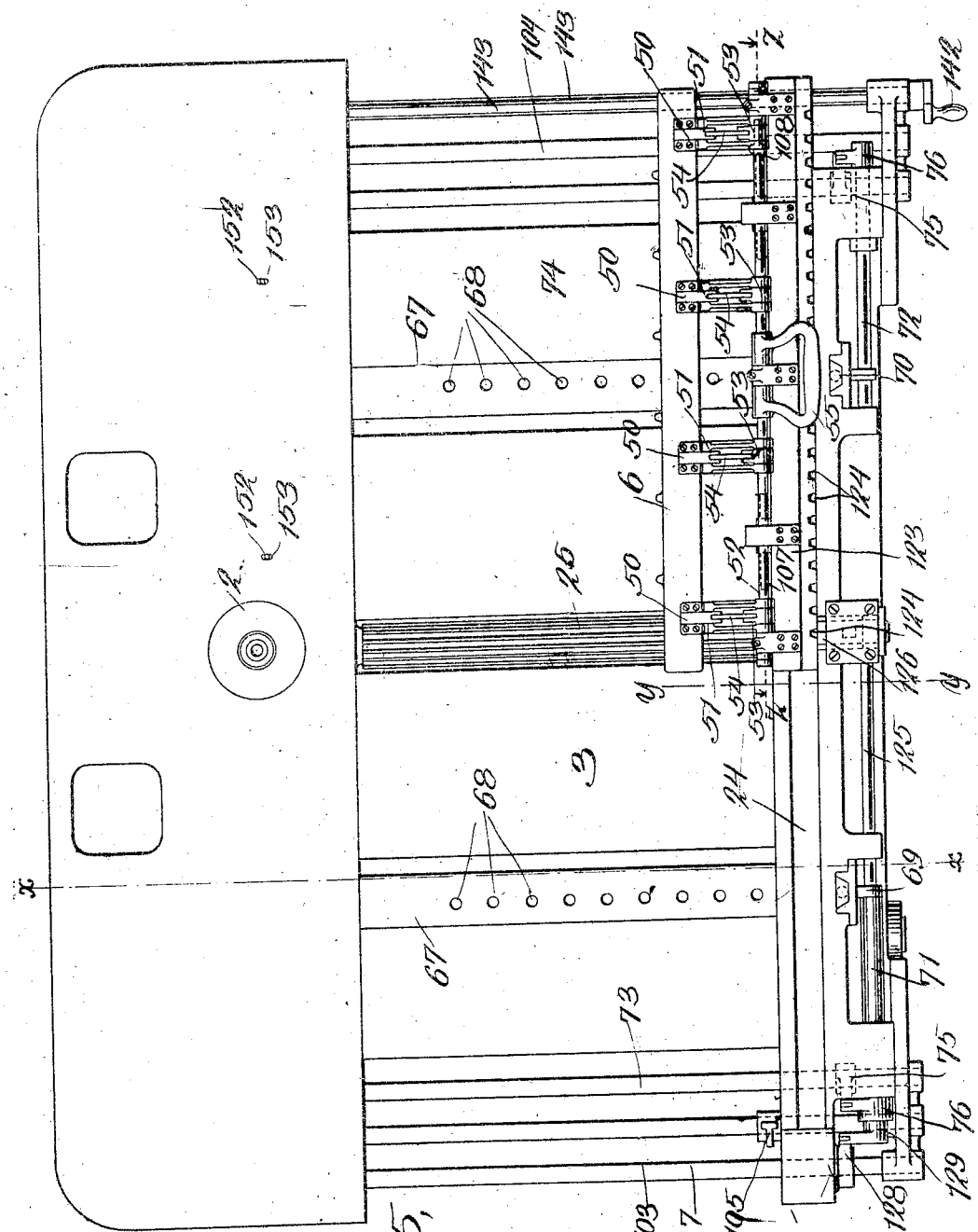

No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 5.
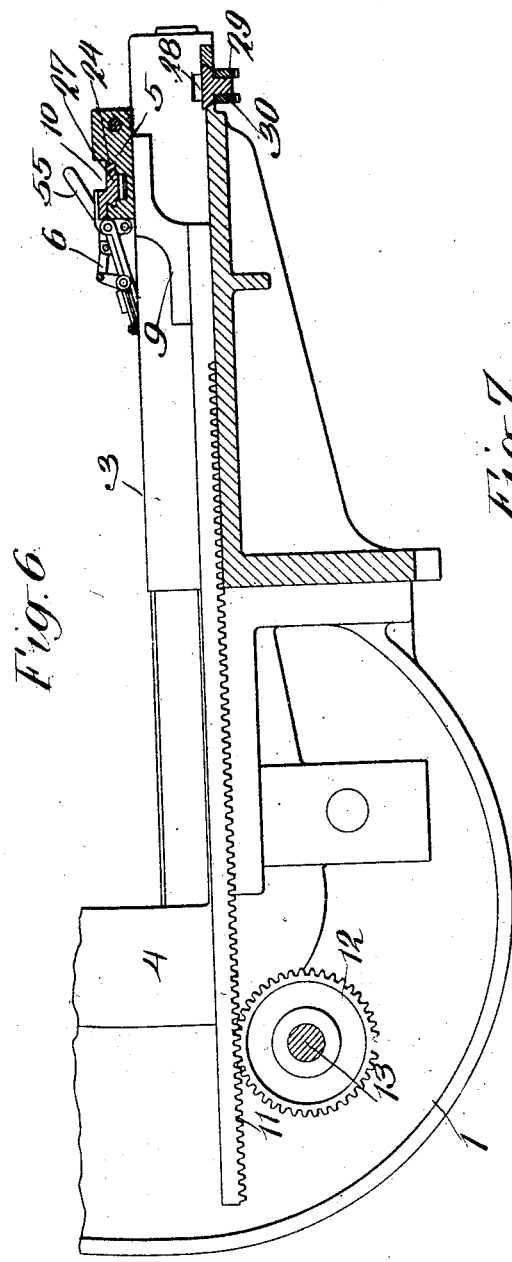
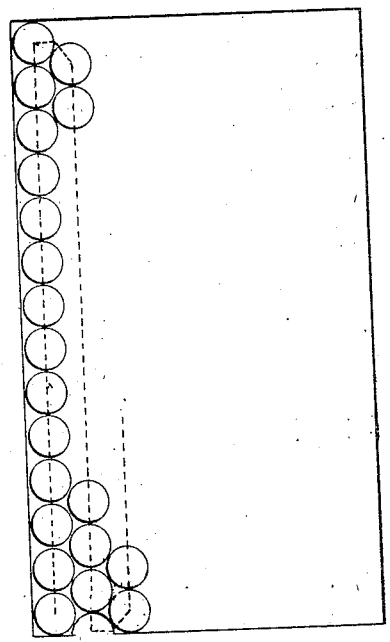

No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 6.

Witnesses:
Inventor:
Otto S. Beyer
by Beeken & Spaulding
his attorneys

No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 7.
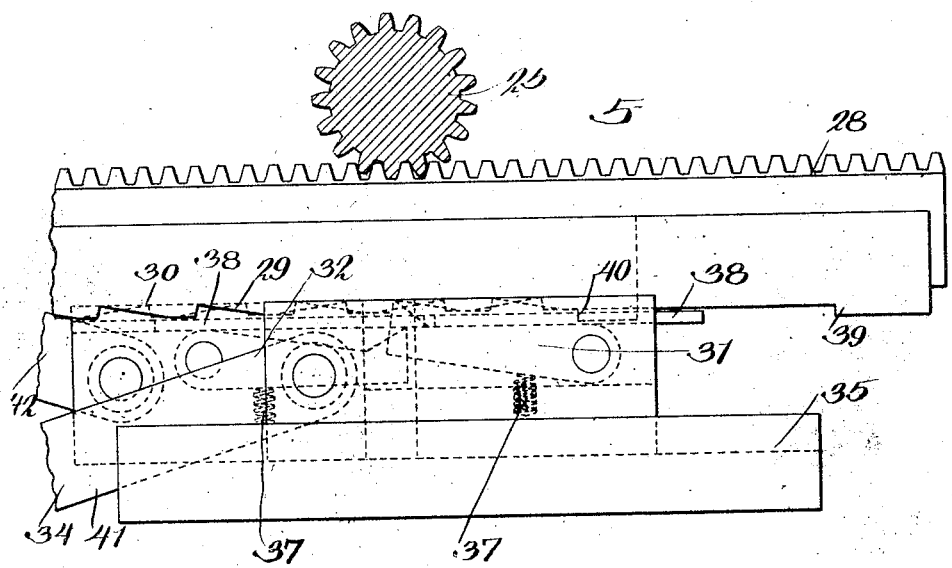
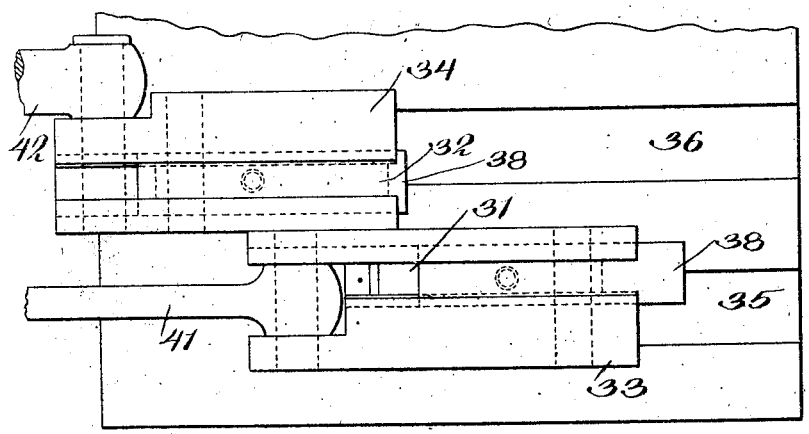
Witnesses:
Inventor:
Otto S. Beyer
by Beeken & Spaulding
his attorneys No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 8.

Witnesses:
Saml Hollingworth
Annie Wissmann

Inventor:
Otto S. Beyer
by Becker & Spaulding
his attorneys

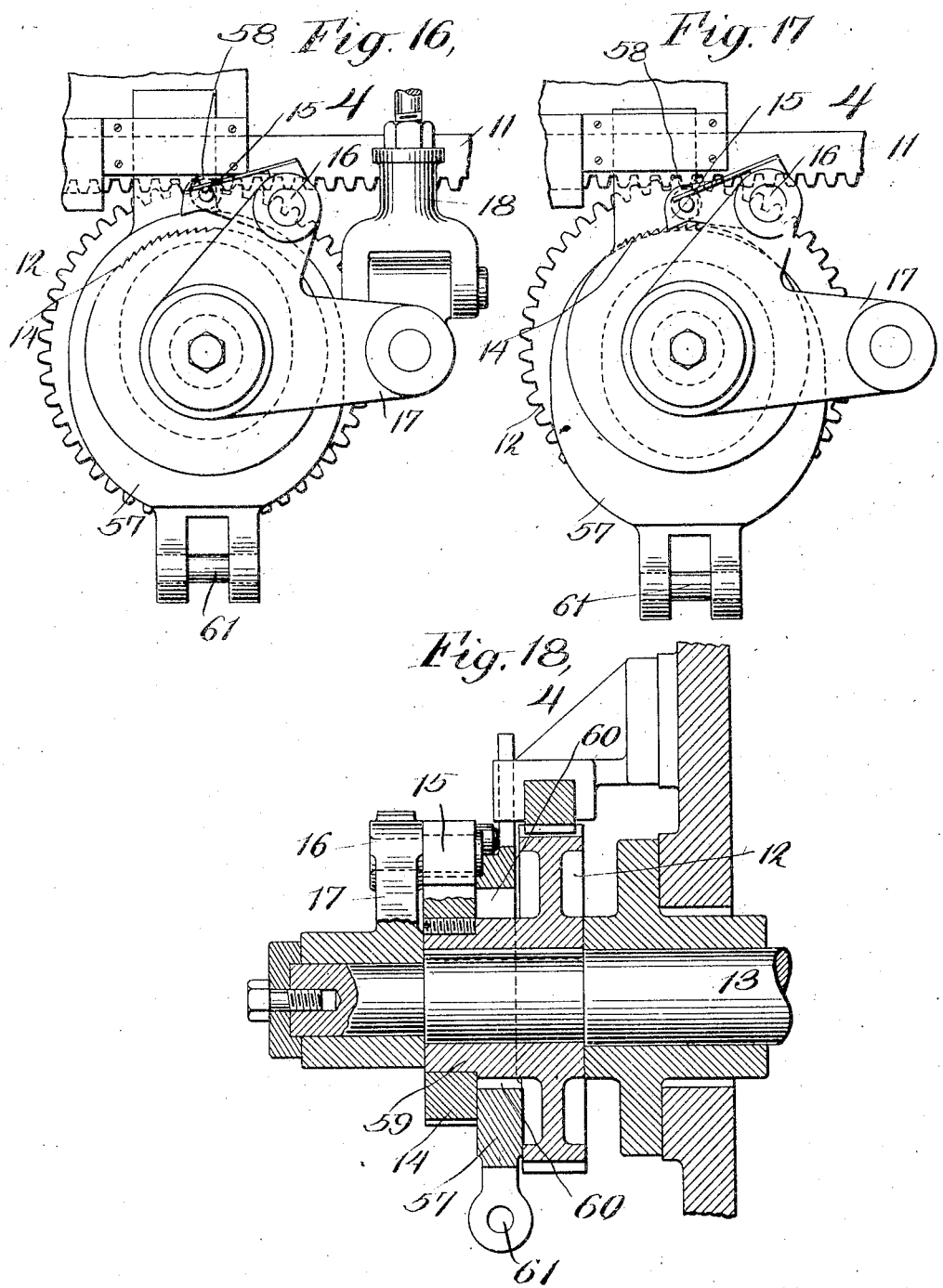

No. 829,250.
PATENTED AUG. 21, 1906.
O. S. BEYER.
WORK FEEDING PUNCHING MACHINE.
APPLICATION FILED SEPT. 24, 1903.
13 SHEETS—SHEET 10.
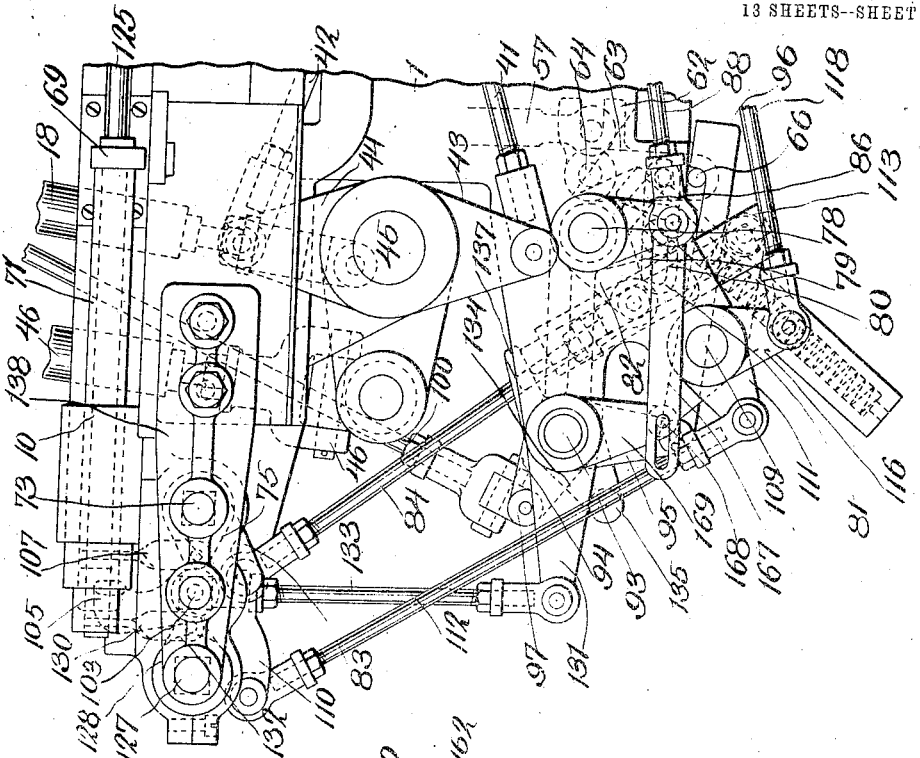
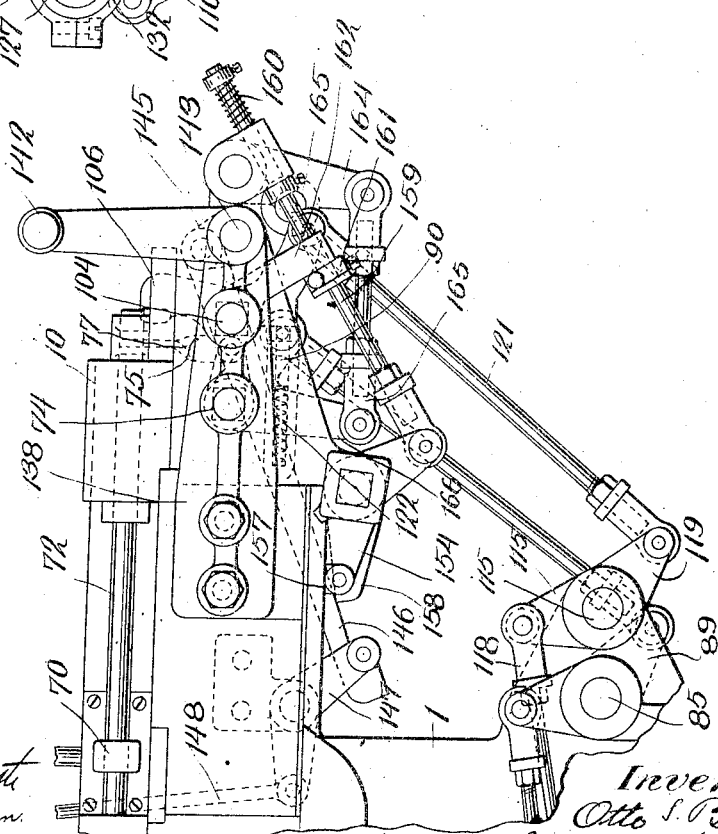
Witnesses:
Inventor:
Otto S. Beyer
by Becken & Spaulding
his attorneys No. 829,250. PATENTED AUG. 21, 1906.
O. S. BEYER.
WORK FEEDING PUNCHING MACHINE.
APPLICATION FILED SEPT. 24, 1903.
13 SHEETS—SHEET 11.

Witnesses:
Saml Hollingsworth
Annie Wissmann

Inventor:
Otto S. Beyer,
by Beeken & Spaulding
his attorneys

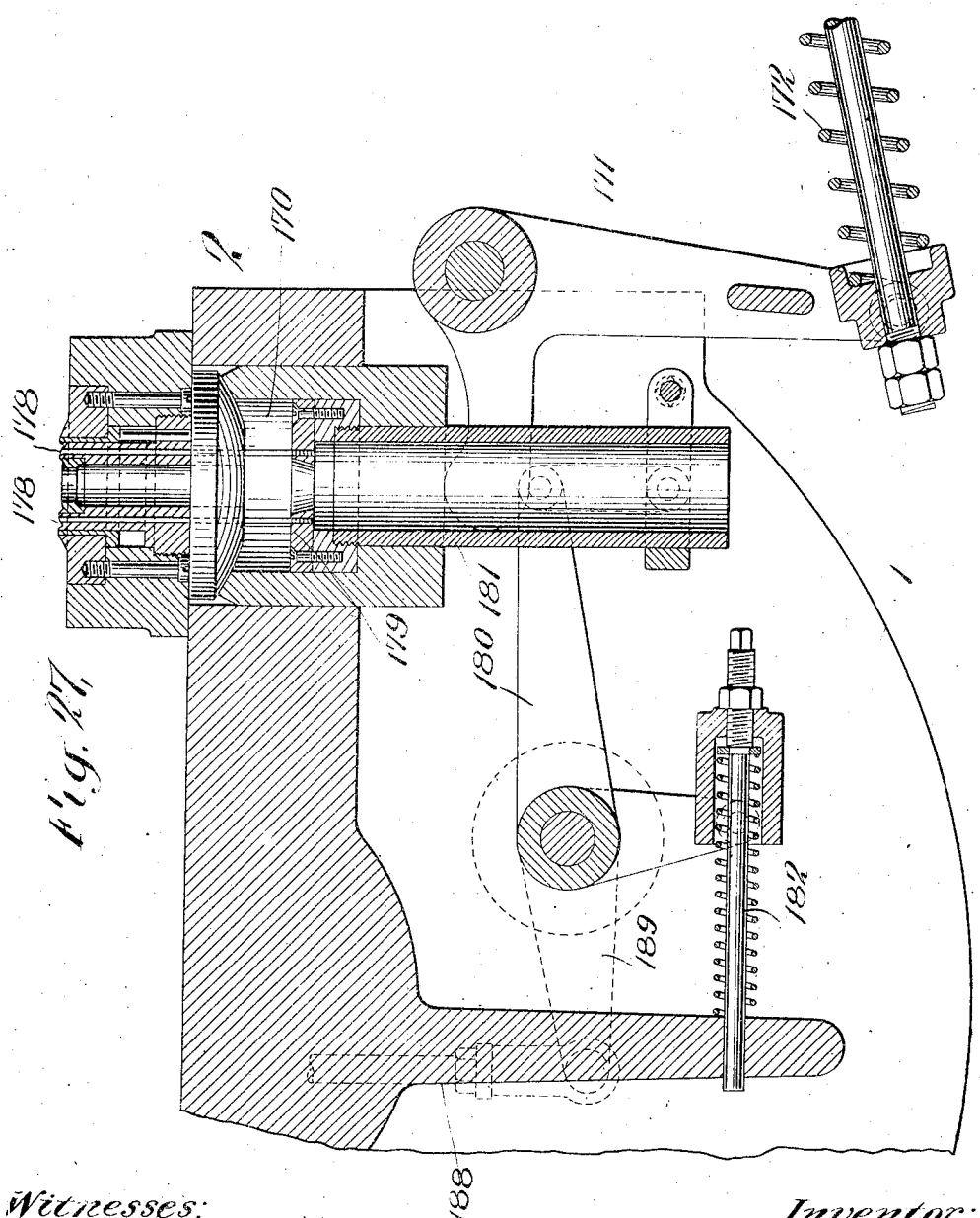

No. 829,250.  
PATENTED AUG. 21, 1906.
O. S. BEYER.  
WORK FEEDING PUNCHING MACHINE.  
APPLICATION FILED SEPT. 24, 1903.
13 SHEETS—SHEET 13.
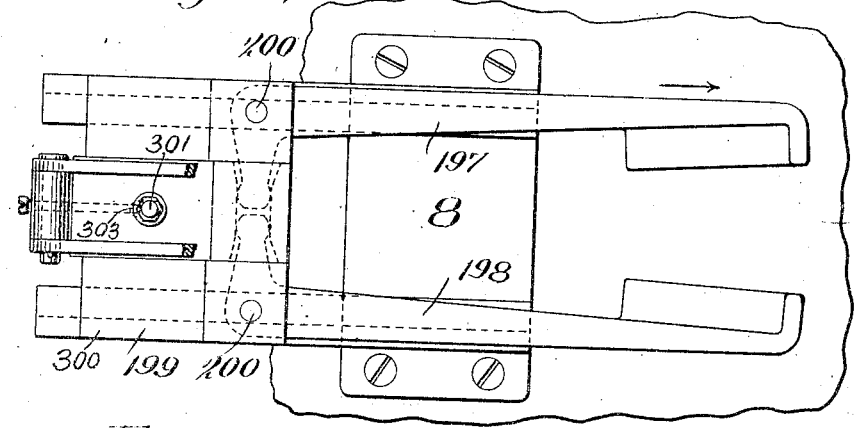
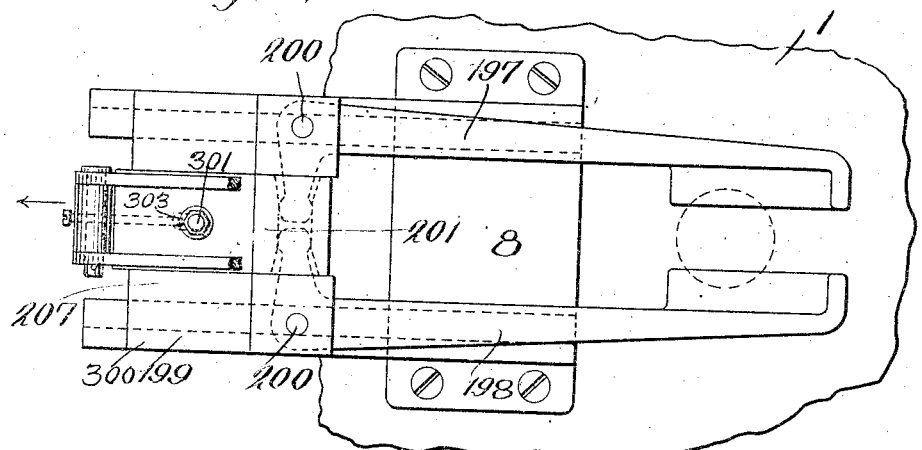
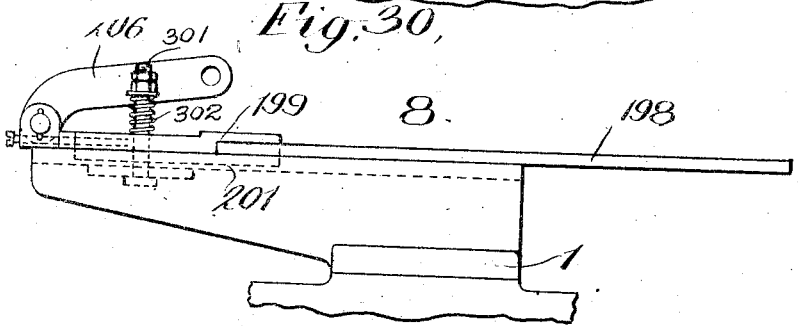
Witnesses:  
Inventor:  
Otto S. Beyer  
by Beeker & Spaulding  
his attorneys

UNITED STATES PATENT OFFICE.

OTTO S. BEYER, OF EAST RUTHERFORD, NEW JERSEY, ASSIGNOR TO E. W. BLISS COMPANY, A CORPORATION OF WEST VIRGINIA.

WORK-FEEDING PUNCHING-MACHINE.

No. 829,250.    Specification of Letters Patent.    Patented Aug. 21, 1906.

Application filed September 24, 1903. Serial No. 174,458.

*To all whom it may concern:*

Be it known that I, OTTO S. BEYER, a citizen of the United States of America, and a resident of East Rutherford, county of Bergen, and State of New Jersey, have invented certain new and useful Improvements in Work-Feeding Punching-Machines, of which the following is a specification.

My invention relates generally to work-feeding punching-machines, and has more particular reference to automatic mechanism for punching a sheet of material up into blanks, such as bottle-caps, can-heads, &c.

In the art it has been customary to provide feeding mechanism, in connection with die mechanism, adapted to feed a sheet of material transversely and in a forward direction with relation to the said die mechanism, the blanks being punched out one at a time in transverse rows, the forward or advance feeding movement taking place after each transverse row has been finished. To utilize all the material possible, the adjacent rows of blanks are generally staggered in a well-known manner. The feeding mechanism as heretofore used, however, could not be adjusted to produce a varying number of rows of blanks with a varying number of blanks in each row, the same number of rows with the same number of blanks in each row being always produced in the same machine.

My invention contemplates the production of a machine in which a variably-predetermined number of transverse rows of blanks can be punched out with a variably-predetermined number of blanks in each row, the blanks being punched out one at a time, so that if a relatively small size of blank is desired a greater number of rows can be punched out, while if a relatively large size of blank is desired a less number of rows are punched out in the same machine, the number of blanks in each row varying in accordance with the size of the blank, so that all the material is used, while the size of the sheet from which the blanks are produced remains constant, though a constant size of sheet need not be used.

A further disadvantage experienced in former machines lies in the fact that the alinement of the feeding mechanism has not always been reliable. By introducing locking means for both the advance and transverse feeding mechanisms I obtain a perfect alinement which can be adjusted to suit the size of blanks to be produced and the number of transverse rows to be stamped out, together with the number of blanks in each row.

The machine will preferably be automatic throughout, the throw of a single lever controlling all the operating mechanism and causing the machine to go through a prescribed cycle of movements a predetermined number of times, after which it stops automatically. In so doing it can be adjusted to perform the prescribed cycle of movements a variably-predetermined number of times, corresponding to the number of transverse rows of blanks to be stamped out and to the number of blanks in each row.

The machine will conveniently be operated from a single shaft controlled by some suitable device, as a clutch. When this clutch is thrown into engagement with the actuating mechanism, the machine will continue to operate until the clutch is thrown out again. My machine is so constructed that the clutch will not be thrown out until the forward or advance feeding mechanism has traveled a certain distance, which is the limit of its movement, when the parts will automatically operate means for throwing the clutch out of engagement with the actuating mechanism, thus stopping the machine. By changing the number of steps of the forward feeding mechanism in traversing a certain distance the number of rows of blanks punched out will be determined. Likewise by varying the number of transverse steps which the transverse feeding mechanism takes to traverse the limit of the transverse movement the number of blanks in each row will be determined.

In the automatic construction shown in the present application, which is a preferred form, there are provided suitable actuating mechanism, which, in addition to operating the feeding and die mechanisms act to operate the locking mechanism for the said feeding mechanisms. A clutch, as previously stated, will preferably be utilized to control the actuating mechanism. Suitable means are provided for throwing the clutch into engagement with the actuating mechanism, after which the machine goes through a prescribed cycle of movements a variably-predetermined number of times and then automatically stops. Means, however, are provided for stopping the machine at will, and means are further provided for withdrawing the locking means independently of the actuating mechanism, so that the forwardly and transversely moving carriages forming part of the feeding mechanisms can be drawn back to their original position. In other words, the machine can be stopped at will with the locking means locked or withdrawn. The means for effecting this will preferably include a lever and connections, the arrangement of the parts being such that when the said lever is in its central position the clutch is thrown out of engagement with the actuating mechanism, the locking means being locked. When the said lever is moved in one direction from its central position, the clutch is thrown into engagement with the actuating mechanism, the locking means being thereby withdrawn when the machine starts, and when the said lever is moved in the opposite direction from its central position the locking means are withdrawn independently of the actuating mechanism and clutch, which latter remains out of engagement with the actuating mechanism.

The feeding mechanisms for the sheet comprise in part a forwardly-moving carriage and a transversely-moving carriage mounted one upon the other and supporting a suitable sheet-gripping device, which latter partakes of the motion of both. In the present instance the transversely-moving carriage is mounted on the forwardly-moving carriage, the sheet-gripping device being mounted in turn upon the transversely-moving carriage. The forwardly-moving carriage is movably supported in the framework. Suitable driving mechanism for moving this carriage step by step is provided, consisting in the present instance of two straight racks carried by the said forwardly-moving carriage and meshing with two gears, which in turn are controlled by a ratchet and pawl for obtaining an intermittent progressive motion in one direction only. This pawl is operated by means of a cam and connections or through other suitable means. The transversely-moving carriage is supported by and slides on the forwardly-moving carriage, although the order might be reversed without the exercise of invention, and travels with the said forwardly-moving carriage in a forward direction. To impart the transverse feeding motion step by step to this transversely-moving carriage at any point in a forward or longitudinal direction in a simple and effective manner, I provide a centrally-disposed and longitudinally-extending intermediate gear of a length substantially equal to the length of the feeding motion of the forwardly-moving carriage, together with means for driving said gear alternately in opposite directions, and for transferring the motion of the said intermediate gear to the transversely-moving carriage. From this long intermediate gear the feeding motion can of course be imparted to the transversely-moving carriage at any point to which it may be carried during its travel in a forward and transverse direction. This motion, however, is preferably imparted through a pinion carried by the forwardly-moving carriage and a transversely-moving rack carried by the transversely-moving carriage. The long intermediate gear in turn is operated from a transversely-moving rack sliding in the framework and provided with two opposed straight ratchets with which engage two pawls. Means are further provided for throwing the said pawls alternately in and out of engagement with the said ratchets. Motion is imparted to these pawls in any suitable manner, as by means of a cam and connections.

To obtain the staggered effect of adjacent transverse rows of blanks, the advance and transverse feeding mechanisms are arranged to operate as follows: Before the transverse feeding takes place an initial forward step of the sheet has to be taken, which with the present construction occurs simultaneously, or substantially so, with the first step in a transverse direction, the combined forward and transverse step bringing the sheet into the desired position with relation to the die mechanism. The transverse feeding motion then continues step by step until the end of the transverse movement has been reached in one direction, after which another forward step is taken, preferably simultaneously with the first transverse step, in the opposite direction. In other words, a forward step has to be taken preparatory to the transverse feeding motion, another forward step being taken after the limit of the transverse motion has been reached in either direction. It is evident if the initial step of the transversely-moving carriage or the initial stroke of either of the straight ratchets were of equal length with the succeeding strokes that the adjacent rows of blanks would not be staggered. The two ratchets are therefore so positioned with relation to each other that at the moment when one pawl disengages with one ratchet and the other pawl engages with the other ratchet the initial stroke of the pawl engaging with the ratchet will move the latter only half the distance of the succeeding strokes, so that the initial step of the transversely-moving carriage is of a length equal to substantially half the distance of the succeeding steps.

The locking means referred to will preferably take the form of two removable longitudinal portions on the framework having each a series of longitudinally-disposed apertures, a removable transverse portion on the transversely-moving carriage having transversely-disposed apertures and locking-pins on the forwardly-moving carriage for engaging with the said apertures. This order of arrangement could of course be reversed or other means substituted without evading the principle of the invention, and the claims should be so constructed. The locking-pins referred to will preferably be located on rock-shafts transversely disposed and traveling with the forwardly-moving carriage. Motion will preferably be imparted to the said traveling rock-shafts from stationary and longitudinally-disposed rock-shafts on both sides of the machine through suitable means traveling over the said stationary rock-shafts and with the forwardly-moving carriage.

The die mechanism, as previously pointed out, may of course be of any suitable construction, depending upon the style of product desired, and may be constructed merely to punch the sheet into blanks or both to punch and draw up the blanks from the sheet. When, as in the present instance, the die mechanism is adapted to both punch and draw up the blank, a positive stripping mechanism is provided, actuated by cams or otherwise. In that instance also means are provided for removing or pushing out the blank from the die mechanism, all of which will be more particularly described hereinafter.

Other objects and improvements will appear as the specification proceeds.

To facilitate the explanation of my invention, I have embodied it in a machine shown in the accompanying drawings, to the precise construction of which, however, I do not wish to be understood as limiting myself, it being obvious that changes of construction can be made without departing from the spirit of the invention and the scope of the claims.

Figure 2:
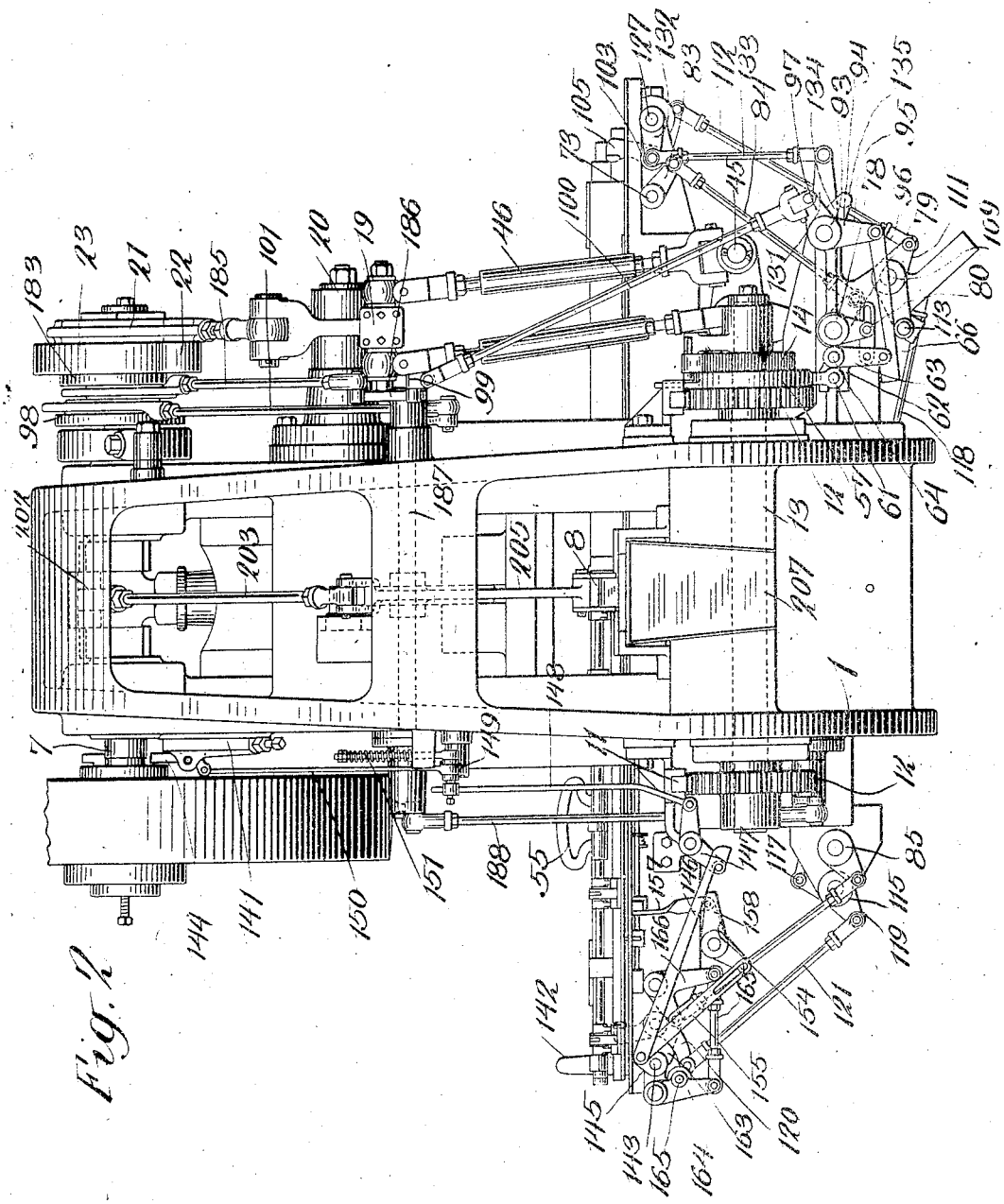
Figure 8:
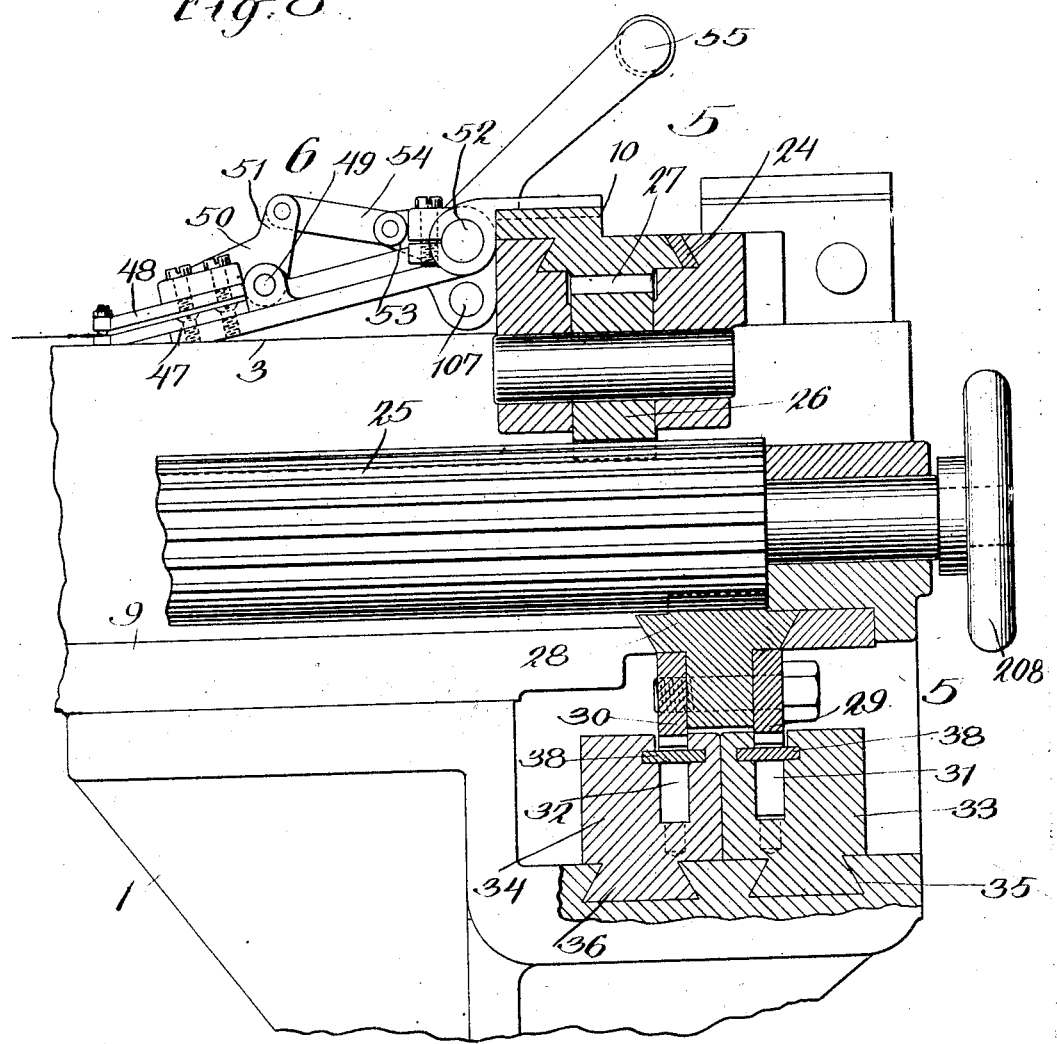
Figure 9:
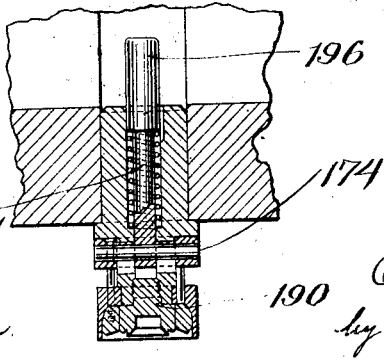
Figure 12:
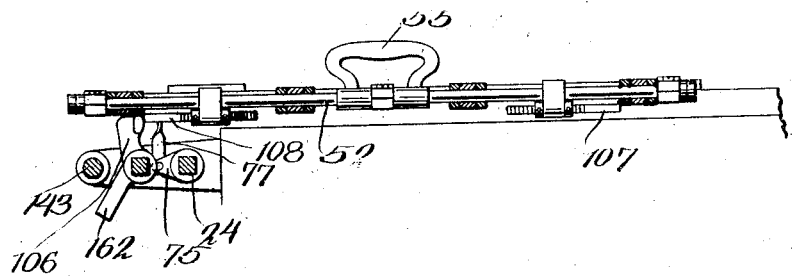
Figure 13:
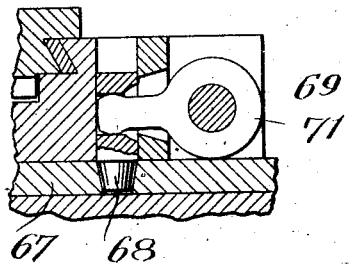
Figure 14:
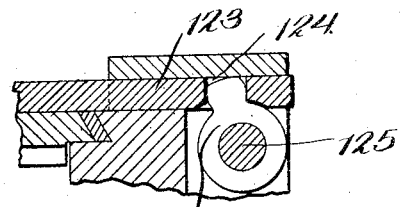
Figure 15:
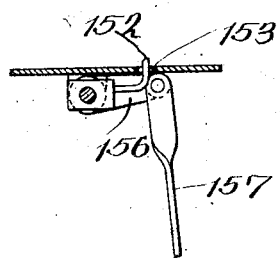
Figure 21:
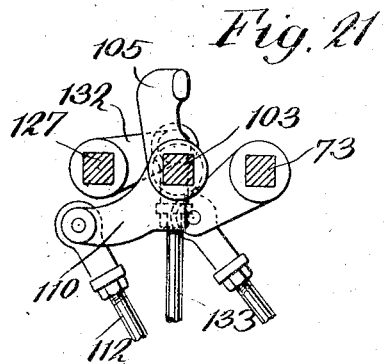
Figure 22:
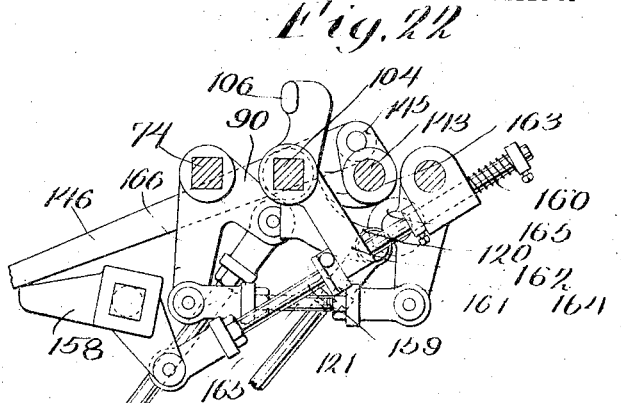
Figure 23:
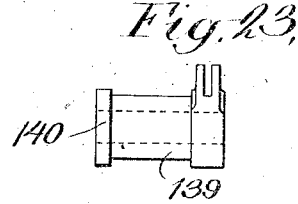
Figure 24:
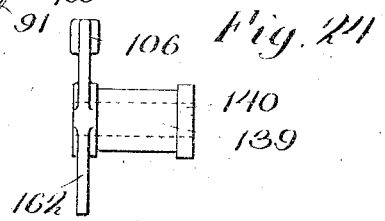
Figure 25:
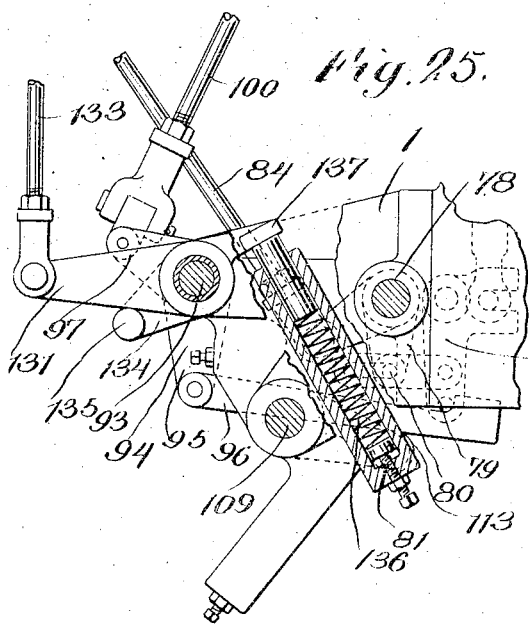
Figure 26:
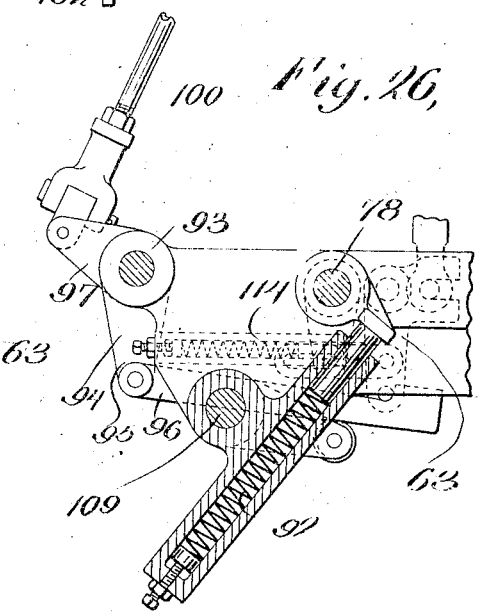

In the said drawings, Figure 1 is a front elevation of a machine embodying my invention. Fig. 2 is a rear elevation of the machine on a slightly larger scale. Fig. 3 is a side elevation of the machine. Fig. 4 is a detailed view showing the cam for actuating the advance and transverse feeding mechanisms. Fig. 5 is a plan view of the feed-table with parts removed to facilitate the explanation of the invention. Fig. 6 is a sectional view through the said feed-table, also with parts removed, on the line x x of Fig. 5. Fig. 7 is a diagrammatic view showing the sheet of material partly acted upon by my machine, indicating the movement of the transverse and advance feeding mechanism. Fig. 8 is a sectional view, on an enlarged scale, on the line y y of Fig. 5. Fig. 9 is a sectional view of the punch and adjacent parts of the die mechanism. Fig. 10 is a detailed view of some of the parts for imparting motion to the transverse feeding mechanism. Fig. 11 is a top view of the pawls for engaging with the straight ratchets shown in Fig. 10. Fig. 12 is a sectional view on the line z z of Fig. 5. Figs. 13 and 14 are sectional detailed views showing the locking-pins for the forward and transverse feeding mechanisms. Fig. 15 is a detailed view showing one of the front gages for the sheet. Figs. 16, 17, and 18 are detailed views of the pawl-and-ratchet mechanism controlling the advance feeding mechanism. Figs. 19 and 20 are enlarged detailed views of the lever connections as they appear in Fig. 1. Figs. 21, 22, 23, 24, 25, and 26 are detail and sectional views of the lever connections shown more specifically in Figs. 19 and 20. Fig. 27 is a sectional view of the die part proper. Figs. 28, 29, and 30 are detail views of the stripping mechanism of the die mechanism.

Similar characters of reference indicate corresponding parts in the different views.

1 indicates a framework of any suitable construction and adapted to support the various parts of the machine in the proper manner.

2 denotes the die mechanism, and 3 the feed-table, arranged in front of the said die mechanism.

The other main parts of the machine are indicated as follows:

4 is the advance feeding mechanism, 5 the transverse feeding mechanism, and 6 is the sheet-gripping device.

The motion imparted to the various parts will preferably be obtained from a single power-shaft 7, although of course there would be no invention in operating it from several shafts.

8 is the stripping mechanism.

The immediate elements which move the sheet forwardly and transversely are the forwardly-moving carriage 9 and the transversely-moving carriage 10, mounted one upon the other, so that the sheet will partake of both motions. In the present instance the transversely-moving carriage is mounted and slides upon the forwardly-moving carriage.

The forward or advance feeding mechanism is constructed as follows: A forwardly-moving carriage 9 is mounted slidably in the framework and provided in this case with two longitudinally-disposed racks 11, although one or any number of racks could be used, and the claims should be constructed accordingly. Meshing with these racks are two gears 12, mounted on the transverse shaft 13. Mounted adjacent to one of said gears and moving with the same is a ratchet 14, with which engages the pawl 15, mounted on the pin 16 and driven suitably from the power-shaft, as by means of the bell-crank 17, lever 18, connected at one end with the said bell-crank and adjustably attached at its other end with the slide 19 of the pivoted lever 20, connected with the yoke 21, carrying the roll 22, engaging with the cam 23.

This imparts an intermittent progressive motion in one direction only to the ratchet aforesaid, and consequently to the gears 12.

The transverse feeding mechanism consists of the transversely-moving carriage 10, mounted on the forwardly-moving carriage 9 and adapted to slide in the way 24 of the said carriage 9. A long intermediate gear 25, disposed longitudinally and extending a distance substantially equal to the forward feeding motion, is mounted in the framework. Carried by the forwardly-moving carriage 9 and moving with the same is a pinion 26, meshing with the transverse rack 27, carried by the transversely-moving carriage. Sliding in the framework is a transverse rack 28, engaging with the intermediate gear 25 and carrying two transversely-disposed straight ratchets 29 and 30. Located below the said straight ratchets are two pawls 31 and 32, mounted on the sliders 33 and 34, traveling in the grooves 35 and 36 of the framework. These pawls are normally held in engagement with the straight ratchets by means of the springs 37 and are adapted to be thrown alternately out of and into engagement with the said ratchets by means of the flat pieces 38 by the latter coming into contact with the heels 39 and 40 on the transversely-moving rack 28 at the end of the feeding motion in each direction, so that the said pawls will alternately engage with the said ratchets to move the transversely-moving carriage in opposite directions. The sliders 33 and 34 are suitably reciprocated by means of the levers 41 and 42, attached to the said sliders with one end and secured to the levers 43 and 44 on the rock-shaft 45 at their other ends. The rock-shaft 45 is disposed longitudinally at one side of the framework and receives its motion from the power-shaft 7 by means of the lever 46, extending from the said rock-shaft 45 to the slide 19, where it is adjustably secured and is operated from the same cam as lever 18 for the forward feeding mechanism.

The sheet-gripping device moves with the forwardly and transversely moving carriages and is in the present instance mounted on the transversely-moving carriage. This sheet-gripping device comprises two jaws 47 and 48, the lower one of which is stationary and the upper one of which is pivoted on the pins 49 by means of one or more bell-cranks 50. The arms 51 of the bell-cranks are suitably connected to the rock-shaft 52 by means of the crank-levers 53 and links 54. A suitable gripping-handle 55 is attached to the rock-shaft 52, by means of which the device is operated. This makes a very positive gripping device for holding the sheet.

When the machine is ready to be operated, the sheet occupies the position indicated in Fig. 5, which, as will be noted, is a position in which the sheet is not in over the die mechanism. Before the transverse feeding takes place an initial forward step of the sheet has to be taken, which with the present construction occurs simultaneously, or substantially so, with the first step in a transverse direction, the combined forward and transverse step bringing the sheet in proper position with relation to the die. The transverse feed then continues until the end of the movement is reached, when another forward step is taken simultaneously with the first transverse step in the opposite direction. In other words, a forward step has to be taken preparatory to the transverse feed, another forward step being taken after the limit of the transverse movement has been reached in either direction. The path of travel of the sheet is indicated in Fig. 7 and the effect upon the sheet in the same view. An equal number of blanks will of course be punched out in each row, though the position of adjacent rows of blanks will be staggered. In order to obtain this staggered effect, the initial step in each transverse direction should be only half of the succeeding steps. This effect is obtained by positioning the two straight ratchets so with relation to each other that at the moment when one pawl disengages with one of the said ratchets and the other pawl engages with the other ratchet the initial movement of the pawl engaging with the ratchet will move the latter only half the distance moved on the succeeding steps. For this reason the cam 23 is provided with a surface 56, which acts as a dwell, so that the movement of each step of both the forward and transverse feed is interrupted, the cam 23 affecting both feeds alike. The effect of this is that on the initial step the sheet will move half a step forward and half a step in an oblique direction, as indicated in Fig. 7, partaking during the latter half of both a forward and transverse movement, while during the first half it partakes of a forward movement only. On the succeeding steps the sheet will make a full step each time in a transverse direction until the limit of movement in a transverse direction is reached.

From the foregoing it will appear that the transverse feeding mechanism is being operated after each blank has been punched, while the forward feeding mechanism will operate only after a whole row of blanks has been punched out. In other words, the transverse feeding mechanism is continuously in engagement with its actuating means, while the forward feeding mechanism has to be thrown in and out of engagement with its actuating means at the proper periods. To effect this engagement and disengagement of the forward feeding mechanism with its actuating mechanism, I construct the pawl 15 with a pawl-lifter 57, engaging with the roll 58, carried by the pawl and mounted on the bushing 59 of the ratchet 14, it being provided with a slot 60, so that it can be raised up and down to engage and disengage the pawl with its ratchet. The means for moving the pawl-lifter up and down comprise a pin 61, carried at the lower end of the pawl-lifter, embraced by the bifurcated arm 62 of the bell-crank lever 63, pivoted on the stud 64, whose other arm has a pin 66.

Suitable locking mechanism for the forwardly and transversely moving carriages is provided so as to obtain perfect alinement, the said locking mechanism being adjustable to enable a variably-predetermined number of rows of blanks with a variably-predetermined number of blanks in each row to be produced. The locking mechanism will preferably take the form of locking-pins adapted to engage with corresponding apertures to lock and unlock the carriages after each step. It will of course be understood that the locking mechanism for the forwardly-moving carriage and the locking mechanism for the transversely-moving carriage are operated independently of each other and in conjunction with or timed to operate at periods corresponding to the movements of their respective carriage or feed mechanism.

The locking mechanism for the forward feeding mechanism is as follows: Mounted on the framework are two longitudinally-extending strips or portions 67, stationarily located and longitudinally disposed, having each a series of longitudinally-disposed apertures 68. 69 and 70 are pivoted locking-pins suitably mounted on the forwardly-moving carriage, the pin 69 being mounted on the transversely-extending rock-shaft or sleeve 71, located in front of the machine and moving with the said forwardly-moving carriage. The pin 70 is located on the transversely-extending rock-shaft 72, also moving with the forwardly-moving carriage. Located at right angles to the shafts 71 and 72 and on either side of the machine are two longitudinally-disposed rock-shafts 73 and 74. These shafts 73 and 74 are stationarily located and impart their rocking motion to the traveling shafts 71 and 72 by means of the crank-levers 75 and 76, connected by the links 77. The shafts 73 and 74 must of course be timed to operate at periods corresponding to the action of the forward feeding mechanism and conveniently receive their motion from the means for lifting and lowering the pawl-lifter. They could of course be operated separately to correspond with the action of the pawl-lifting means; but to simplify the construction of the machine and to avoid a needless multiplicity of elements I prefer to mount a longitudinally-extending rock-shaft 78 in the framework, carrying a crank-lever 79, having a pin 80 engaging with the slotted link 81, moving with the bell-crank 63. The rock-shaft 78 is suitably connected to the rock-shaft 73 by means of the crank-levers 82 and 83 and connecting-lever 84. On the other side of the machine is another longitudinally-disposed rock-shaft 85, similar to the shaft 78 and moving in unison with the latter by means of the crank-levers 86 and 87 and connection-lever 88. The rock-shaft 85 is connected to the rock-shaft 74 in the same manner as the shaft 78 connects with the shaft 73—viz., by means of the crank-levers 89 and 90 and connecting-lever 91. In this way the two forward locking-pins are caused to engage and disengage with their corresponding apertures at time corresponding to the engagement and disengagement of the pawl with the ratchet for causing the forward feed, the pins snapping into their corresponding apertures by means of the springs 92 and being withdrawn by means of the motion of the bell-crank 63. The bell-crank 63 is operated from means which act once to every revolution of the machine, subject to mechanism which act to allow the operation to take effect only at the end of each transverse movement of the transversely-moving carriage.

The means for operating the bell-crank 63 to rock the same are as follows: Mounted in the framework is a longitudinally-disposed rock-shaft 93, carrying loosely a bell-crank 94, one lever 95 of which carries a hooked lever 96, adapted to engage and disengage with the pin 66 on the bell-crank 63. The other lever 97 of the bell-crank 94 is connected with the cam 98 on the shaft 7 through bell-crank 99, connecting-lever 100, lever 101, and roll 102.

The mechanism which allows the cam 98 to operate the bell-crank 63 only at the end of each transverse movement is as follows: Parallel with the rock-shafts 73 and 74 and located, preferably, in the same plane are located two longitudinally-disposed and stationarily-located rock-shafts 103 and 104, one on either side of the machine. Mounted on these rock-shafts and traveling with the forwardly-moving carriage are two rocking dogs 105 and 106, with which engage the pins 107 and 108, carried by the transversely-moving carriage at the end of each transverse movement. The rock-shaft 103 is connected with the rock-shaft 109 by means of the crank-levers 110 and 111 and connecting-lever 112. The rock-shaft 109 is adapted to move the hooked lever 96 into and out of engagement with the pin 66 of the bell-crank 63 by means of the roll 113. When the transversely-moving carriage comes to the end of its transverse movement in one direction, the pin 107 engages with the rocking dog 105 and through that transmits its motion to the connections just described and causes the hooked lever 96 to engage with the pin 66, thereby allowing the cam 98 to rock the bell-crank 63, thus lowering the pawl-lifter and withdrawing the forward locking-pins, and thereby also allowing the forward feed mechanism to operate. The pawl-lifter is lifted up again by means of the spring 114 acting against the bell-crank 63.

Mounted on the other side of the machine is the longitudinal shaft 115, similar to the shaft 109, with which latter it is connected by means of the crank-levers 116 and 117 and connecting-lever 118. The shaft 115 in turn is connected with the shaft 104 by means of the crank-levers 119 and 120 and connecting-lever 121, so that when the transversely-moving carriage has completed its movement in the opposite direction from its previous movement the pin 108 will engage with the rocking dog 106 and operate the hooked lever 96 in the same manner as previously described. The dogs 105 and 106 are normally kept in an upright position by means of the springs 122, only one of which is seen.

As previously stated, the transversely-moving carriage is also provided with locking means, which preferably take the form of a transversely-extending bar 123, having transversely-disposed apertures 124, the said bar moving with the transversely-moving carriage. Mounted on the forwardly-moving carriage is a transversely-disposed shaft 125, carrying a locking-pin 126, adapted to engage and disengage with the apertures aforesaid. For convenience sake this shaft 125 is located inside of the shaft 71. Located stationarily on one side of the machine is a longitudinally-disposed rock-shaft 127, parallel with the shafts 73 and 103. This shaft 127 is connected with the shaft 125 by means of the crank-levers 128 and 129 and link 130. This rock-shaft 127 is in turn connected with the rock-shaft 93 by means of a lever 131, attached stationarily to the said rock-shaft, lever 132, and connecting-rod 133. The lever 131 could of course be mounted on a separate stud or shaft, but for convenience sake it is located on the said shaft 93. Moving with the bell-crank 94 is a lever 134, carrying a roll 135, which is adapted to lift the lever 131, so as to withdraw the transverse locking-pin once to every revolution of the shaft 7 and to correspond to each transverse step taken by the transversely-moving carriage. The transverse locking-pin is snapped back into its aperture by the action of the spring 136 acting on the arm 137, moving with the lever 131. The side extensions 138 of the forwardly-moving carriage travel over the longitudinal shafts 73 74 103 104 127, which latter to that end are square in cross-section, as shown.

As has been previously indicated, the rocking dogs 105 and 106 and the levers located in the said longitudinal shafts 73 74 108 124 127, which impart motion to the same, must travel with the forwardly-moving carriage. The said dogs and levers are accordingly carried by sleeves 139, which are interposed between the side extensions 138 and the said longitudinal shafts and which are provided with collars 140, so as to move with the said forwardly-moving carriage. The fact that the shafts are square in cross-section prevents circumferential displacement. The shaft 7 is controlled by the clutch 141 of any suitable construction.

142 is an operating-lever controlling the several mechanisms composing the machine and mounted on the longitudinally-extending shaft 143. When this lever is thrown to the right, the clutch-latch 144 is withdrawn through the crank-lever 145, mounted on the shaft 143, hooked lever 146, bell-crank 147, rod 148, pivoted lever 149, and rod 150. The spring 151 normally tends to hold the latch in its closed position.

152 indicates pivoted front gages for the sheet extending up through the apertures 153 of the feed-table. Mounted in the framework is a bell-crank 154, connected at one end with the crank-lever 145, mounted on the rock-shaft 143, by means of link 155. A lever 156 is provided, moving with the front gages and connected with the bell-crank 154 by means of the link 157.

Mounted in the framework is a bell-crank 158 adjacent to the hooked lever 146 and for convenience sake located on the same stud as the bell-crank 154. This bell-crank 158 is connected with the rod 159, provided with the expansion-spring 160, which normally tends to hold the said bell-crank 158 in its lowermost position. Mounted on the said rod 159 is a collar 161. Mounted on the rocking dog 106 is a projection 162, which comes in position adjacent to the collar 161 when the forwardly-moving carriage has come to the end of its movement, Fig. 22. When the transversely-moving carriage now comes to the end of its movement in either direction, depending upon which side it finishes on, the motion imparted to either of the rocking dogs 105 or 106, which move in unison, will be communicated through the projection 162 to the collar 161, compressing the spring 160, and thereby moving the hooked lever 146 out of engagement with the bell-crank 147, thereby allowing the clutch-latch to return and the machine to stop automatically. If it is desired to stop the machine during its operation at will, it is only necessary to throw the lever 142 into its central vertical position.

When it is desired to withdraw the locking-pins for the forwardly and transversely moving carriages by hand and independently of the actuating mechanism, the lever 142 should be thrown to the left, or in a direction from its central position opposite to that in which it is thrown when it is desired to start the machine. The means for effecting this independent withdrawal of the locking-pins are constructed as follows: The shaft 143, on which lever 142 is mounted, carries a small cam 163. Pivoted adjacent thereto is a lever 164, carrying a roll 165, with which the said cam 163 engages. This lever is connected with the lever connections for operating the forward locking-pins by means of rod 210 and link 166. When the lever 142 therefore is thrown to the left, the forward locking-pins are withdrawn through the instrumentality of the means just described and through the connections previously set forth. The lever 86, however, is provided with a slotted link 167, engaging with the pin 168 on the lever 169, attached to the rock-shaft 93, so that the locking-pin for the transverse carriage is withdrawn by the same movement.

The die mechanism consists in part of a die proper, 170, which is normally held up by the bell-crank 171, actuated by the spring 172, the tension of which is adjustable by means of the hand-wheel 173. The punch 174 is operated by the main slide 175. Besides the foregoing there is also a die and punch (numbered, respectively, 176 and 177) for cutting up the scrap.

The die 170 is provided with two pins 178, carried by the plate 179, normally held in an uppermost position by the lever 180, acting upon the sleeve 181, attached to the plate 179, by reason of the spring 182. The pins 178 are moved down by means of the cam 183, roll 184, rod 185, lever 186, shaft 187, rod 188, and lever 189.

The punch 174 is provided with a knockout, formed in the present instance by the member 190, normally held up by the spring 191. 192 is a lever pivoted at 193 and moving with the main slide. At one end it carries a roll 194, engaging with the cam-surface 195, so that when it has traveled a certain distance with the slide it acts to move the member 190 down by pressing on the pin 196, thereby compressing the spring 191.

When, as in the present instance, the die acts both to cut and draw up the blank, a positive stripping mechanism has to be provided. This will preferably take the form of two jaws 197 and 198, carried by the lower slide 201. Above this slide 201 there is another slide 199, carrying the links 206 and adapted to move independently a certain distance of the slide 201. A bridged portion 300 passes over the slide 199 and is attached to the slide 201. A bolt 301, with a spring 302, passes through the bridged portion 300, the slide 199, and slide 201, it being free to move in the oblong hole 303. The parts are suitably operated from the eccentric 202, rod 203, levers 204 and 205, and links 206. It will be seen that when the links 206 move the slide 199 backward it will be moved independently of the slide 201 until the bolt 301 comes to the end of the oblong hole 303, when it will carry the spring 302 with it and also close the jaws slantingly. The reverse movement will take place on the forward stroke of the parts. From this it will be understood that when the punch descends the blank will be punched and drawn up. The two pins 178, owing to their movement independent of the die, will hold the blank up in the punch as the latter ascends. The two jaws of the stripper mechanism will now move forward and the pins 178 be withdrawn by the cam and connections, while the member 190 will move downward and push the blank out of the punch and onto the two jaws of the stripper, which latter will then move backward and deposit the blank on the inclined surface 207.

By changing the longitudinal and transverse strips 67 123 for others with a different number of apertures and by adjusting the different lever connections a variably-predetermined number of rows of blanks with a variably-predetermined number of blanks in each row will be produced.

It will be understood that the construction of the various connections need not be followed, as any mechanical equivalent can be substituted.

The operation of the machine is as follows: Assuming the parts to be in the position shown in Fig. 5 and a sheet to be inserted in the sheet-gripping device, the lever 142 is thrown to the right. This will have the effect of withdrawing the front gages and the latch of the clutch, causing the machine to start. In the said position the rocking dogs 105 and 106 will be in such a position that the hooked lever 96 will be in engagement with the bell-crank 63, so that as the shaft 7 rotates the pawl-lifter will be pulled down and the locking-pins for the forward and transverse feed will be withdrawn. The forwardly-moving carriage and the transversely-moving carriage will also take a step each in its respective direction, thus bringing the sheet into proper position with relation to the die mechanism, the locking-pins snapping in position as soon as the step has been taken. The punch then descends and produces a blank which is disposed of in the manner previously set forth. As soon as the first step has been taken in a transverse direction the rocking dogs 105 106 will assume their normal position, thereby disconnecting the hooked lever 96 from the bell-crank 63, so that on the next rotation of the shaft 7 only the transverse locking-pins will be withdrawn and the transverse feed take place, no forward feeding taking place, owing to the fact that the pawl-lifter has been moved up by the spring 114. Another blank is then produced. This continues until the transversely-moving carriage has reached the limit of its movement in one direction, when it acts upon one of the dogs 105 and 106 to connect the hooked lever 96 with the bell-crank 63 again, thus enabling the forwardly-moving carriage to take another step in a forward direction. As has previously been pointed out, the inital step of the transversely-moving carriage in each direction is equal to but half of the succeeding steps, so as to obtain a staggered effect of adjacent transverse rows. The operation then continues until the forwardly-moving carriage has reached the limit of its movement in a forward direction, when the dog 106 comes in juxtaposition to the collar 161, so that when the last step has been taken in a transverse direction the action of the said dog causes the hooked lever 146 to be disconnected, thereby allowing the clutch to become disengaged from the actuating mechanism and the machine to stop. The lever 142 is now thrown to the left, thereby withdrawing the forward and transverse locking-pins. The forwardly-moving carriage is then drawn back by hand, and the transversely-moving carriage, carrying the sheet-gripping device, is drawn back to its extreme right-hand position by rotating the wheel 208 on the longitudinally-disposed intermediate gear. A new sheet of material is then inserted, and the machine is ready to be started again. If during the operation of the machine it should become necessary to stop the machine, it is only necessary to throw the lever 142 into a vertical position.

Having thus described my invention, what I claim is—

1. In a machine of the character set forth, the combination of a transversely-moving carriage, means for moving the said transversely-moving carriage step by step in opposite directions, locking means adapted to be withdrawn upon each step in either direction, a forwardly-moving carriage, actuating means therefor adapted to be set in motion, to move it one step forward, by the transversely-moving carriage, when the latter comes to its limit of movement in either direction, and locking means for the forwardly-moving carriage adapted to be withdrawn by the actuating means for said forwardly-moving carriage.

2. In a machine of the character set forth, the combination of a transversely-moving carriage, means for moving the said transversely-moving carriage step by step in opposite directions, locking means adapted to be withdrawn upon each step in either direction, a forwardly-moving carriage, actuating means therefor adapted to be set in motion, to move it one step forward, by the transversely-moving carriage, when the latter comes to its limit of movement in either direction, locking means for the forwardly-moving carriage adapted to be withdrawn by the actuating means for said forwardly-moving carriage, and means for throwing the parts out of operation when the limit of movement has been reached by both the forwardly and transversely moving carriages.

3. In a machine of the character set forth, the combination of a transversely-moving carriage, means for moving the said transversely-moving carriage step by step in opposite directions, locking means adapted to be withdrawn upon each step in either direction, a forwardly-moving carriage, actuating means therefor adapted to be set in motion, to move it one step forward, by the transversely-moving carriage, when the latter comes to its limit of movement in either direction, locking means for the forwardly-moving carriage adapted to be withdrawn by the actuating means for said forwardly-moving carriage, and means for throwing the parts out of operation at will.

4. In a machine of the character set forth, the combination of a transversely-moving carriage, means for moving the said transversely-moving carriage step by step in opposite directions, locking means adapted to be withdrawn upon each step in either direction, a forwardly-moving carriage, actuating means therefor adapted to be set in motion, to move it one step forward, by the transversely-moving carriage, when the latter comes to its limit of movement in either direction, locking means for the forwardly-moving carriage adapted to be withdrawn by the actuating means for said forwardly-moving carriage, means for throwing the parts out of operation when the limit of movement has been reached by both the forwardly and transversely moving carriages, and means for throwing the parts out of operation at will.

5. In a machine of the character set forth, the combination with a reciprocating punch, of a transverse feeding mechanism, and an advance feeding mechanism for carrying a sheet transversely and forwardly step by step under the said punch, and means for automatically locking the said feeding mechanisms in the positions to which they have been carried after each step.

6. In a machine of the character set forth, the combination with a reciprocating punch, of a transverse feeding mechanism, and an advance feeding mechanism for carrying a sheet transversely and forwardly step by step under the said punch, means for automatically locking the said feeding mechanisms in the positions to which they have been carried after each step, and actuating means for the punch, feeding mechanisms and locking means.

7. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanism, means for throwing the clutch into engagement with the actuating mechanism thereby operating the locking means and feeding the sheet transversely step by step in opposite directions and in a forward direction at the end of each transverse movement, and means whereby the clutch will disengage itself from the actuating mechanism at the end of a predetermined period, causing the machine to cease operation.

8. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanisms, means for throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of the predetermined period, causing the machine to cease operation, and means for unlocking the locking means independently of the clutch.

9. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanism, means for throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a predetermined period, causing the machine to cease operation, and means for disengaging the clutch from the actuating mechanism at will during the operation of the machine.

10. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanism, means for throwing the clutch into engagement with the actuating mechanism thereby operating the locking means and feeding the sheet transversely step by step in opposite directions, and in a forward direction at the end of each transverse movement, means whereby the clutch will disengage itself from the actuating mechanism at the end of a predetermined period, causing the machine to cease operation, and means for unlocking the locking means independently of the clutch, and means for disengaging the clutch from the feeding mechanisms and locking the locking means at will during the operation of the machine.

11. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a predetermined period causing the machine to cease operation.

12. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of the predetermined period causing the machine to cease operation, and means for withdrawing the locking means independently of the clutch.

13. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanism and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a predetermined period causing the machine to cease operation and means for disengaging the clutch from the operating mechanism at will during the operation of the machine.

14. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a predetermined period causing the machine to cease operation, means for withdrawing the locking means independently of the clutch and means for disengaging the clutch from the actuating mechanism at will during the operation of the machine.

15. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms and locking means, a clutch controlling the said actuating mechanism, means for throwing the clutch into engagement with the actuating mechanism thereby operating the locking means and feeding the sheet transversely step by step in opposite directions and in a forward direction at the end of each transverse movement, and means whereby the clutch will disengage itself from the actuating mechanism at the end of a variably predetermined period, causing the machine to cease operation.

16. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanisms, means for throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a variably predetermined period, causing the machine to cease operation and means for unlocking the locking means independently of the clutch.

17. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanism, means for simultaneously unlocking the locking means and throwing the clutch into engagement with the actuating mechanism thereby feeding the sheet transversely step by step in opposite directions and in a forward direction at the end of each transverse movement, means whereby the clutch will disengage itself from the actuating mechanism at the end of a variably predetermined period, causing the machine to cease operation, and means for disengaging the clutch from the feeding mechanisms at will during the operation of the machine.

18. In a machine of the character set forth, the combination with a transverse feeding mechanism, and an advance feeding mechanism for the sheet, of locking means for the feeding mechanisms adapted to act after each step of the said feeding mechanisms, actuating mechanism controlling the feeding mechanisms, a clutch controlling the said actuating mechanism, means for throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a variably predetermined period, causing the machine to cease operation, means for unlocking the locking means independently of the clutch, and means for disengaging the clutch from the feeding mechanisms at will during the operation of the machine.

19. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, and means whereby the clutch will disengage itself from the actuating mechanism at the end of a variably predetermined period causing the machine to cease operation.

20. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby feeding the sheet over the die transversely step by step in opposite directions and in a forward direction at the end of each transverse movement, means whereby the clutch will disengage itself from the actuating mechanism at the end of a variably predetermined period causing the machine to cease operation and means for withdrawing the locking means independently of the clutch.

21. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a variably predetermined period causing the machine to cease operation, and means for disengaging the clutch from the operating mechanism at will during the operation of the machine.

22. In a machine of the character set forth, the combination with a die, of a transverse feeding mechanism and an advance feeding mechanism for the sheet, of locking means for the feeding mechanisms adapted to act after each step of the said feeding mechanisms, actuating mechanism controlling the die, feeding mechanisms and locking means, a clutch controlling the said actuating mechanism, means for throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a variably predetermined period causing the machine to cease operation, means for withdrawing the locking means independently of the clutch and means for disengaging the clutch from the operating mechanism at will during the operation of the machine.

23. In a machine of the character set forth, the combination with a transverse feeding mechanism and an advance feeding mechanism for the sheet, of locking means for the feeding mechanisms, adapted to act after each step of the feeding mechanisms, front gages for the sheet, actuating mechanism controlling the feeding mechanisms, locking-pins, a clutch controlling the said actuating mechanism, means for withdrawing the front gages and throwing the clutch into engagement with the actuating mechanism, thereby operating the locking means and feeding the sheet transversely step by step in opposite directions and in a forward direction at the end of each transverse movement, means whereby the clutch will disengage itself from the actuating mechanism at the end of a predetermined period causing the machine to cease operation.

24. In a machine of the character set forth, the combination with a transverse feeding mechanism, and an advance feeding mechanism for the sheet, of locking means for the feeding mechanisms adapted to act after each step of the said feeding mechanisms, front gages for the actuating mechanism controlling the feeding mechanisms, a clutch controlling the said actuating mechanism, means for withdrawing the front gages and throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a variably predetermined period causing the machine to cease operation.

25. In a machine of the character set forth, the combination with a transverse feeding mechanism, and an advance feeding mechanism for the sheet, of locking means for the feeding mechanisms adapted to act after each step of the said feeding mechanisms, front gages for the actuating mechanism controlling the feeding mechanisms, a clutch controlling the said actuating mechanism, means for withdrawing the front gages and throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a variably predetermined period causing the machine to cease operation and means for unlocking the locking means independent of the clutch.

26. In a machine of the character set forth, the combination with a transverse feeding mechanism, and an advance feeding mechanism for the sheet, of locking means for the feeding mechanisms adapted to act after each step of the said feeding mechanisms, front gages for the actuating mechanism controlling the feeding mechanisms, a clutch controlling the said actuating mechanism, means for withdrawing the front gages and throwing the clutch into engagement with the actuating mechanism thereby operating the locking means and feeding the sheet transversely step by step in opposite directions and in a forward direction at the end of a variably predetermined period, causing the machine to cease operation, and means for disengaging the clutch from the feeding mechanisms at will during the operation of the machine.

27. In a machine of the character set forth, the combination with a transverse feeding mechanism, and an advance feeding mechanism for the sheet, of locking means for the feeding mechanisms adapted to act after each step of the said feeding mechanism, front gages for the actuating mechanism controlling the feeding mechanisms, a clutch controlling the said actuating mechanism, means for withdrawing the front gages and throwing the clutch into engagement with the actuating mechanism thereby operating the locking means and feeding the sheet transversely step by step in opposite directions and in a forward direction at the end of each transverse movement, means whereby the clutch will disengage itself from the actuating mechanism at the end of a variably predetermined period, causing the machine to cease operation, means for unlocking the locking means independently of the clutch and means for disengaging the clutch from the actuating mechanism at will during the operation of the machine.

28. In a machine of the character set forth, the combination with a die, of a transverse feeding mechanism and an advance feeding mechanism for the sheet, of locking means for the feeding mechanisms adapted to act after each step of the said feeding mechanisms, front gages for the sheet, actuating mechanism controlling the die, feeding mechanisms and locking means, a clutch controlling the said actuating mechanism, means for withdrawing the front gages and throwing the clutch into engagement with the actuating mechanism thereby operating the locking means and feeding the sheet over the die transversely step by step and in a forward direction at the end of each transverse movement, means whereby the clutch will disengage itself from the actuating mechanism at the end of a variably predetermined period causing the machine to cease operation.

29. In a machine of the character set forth, the combination with a die, of a transverse feeding mechanism and an advance feeding mechanism for the sheet, of locking means for the feeding mechanisms adapted to act after each step of the said feeding mechanisms, front gages for the sheet, actuating mechanism controlling the die, feeding mechanisms and locking means, a clutch controlling the said actuating mechanism, means for withdrawing the front gages and throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a variably predetermined period causing the machine to cease operation, and means for withdrawing the locking means independently of the clutch.

30. In a machine of the character set forth, the combination with a die, of a transverse feeding mechanism and an advance feeding mechanism for the sheet, of locking means for the feeding mechanisms, adapted to act after each step of the said feeding mechanisms, front gages for the sheet, actuating mechanism controlling the die, feeding mechanisms and locking means, a clutch controlling the said actuating mechanism, means for withdrawing the front gages and throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a variably predetermined period causing the machine to cease operation and means for disengaging the clutch from the actuating mechanism at will during the operation of the machine.

31. In a machine of the character set forth, the combination with a die, of a transverse feeding mechanism and an advance feeding mechanism for the sheet, of locking means for the feeding mechanisms, adapted to act after each step of the said feeding mechanisms, front gages for the sheet, actuating mechanism controlling the die, feeding mechanisms and locking means, a clutch controlling the said actuating mechanism, means for withdrawing the front gages and throwing the clutch into engagement with the actuating mechanism thereby operating the locking means and feeding the sheet over the die transversely step by step in opposite directions and in a forward direction at the end of each transverse movement, means whereby the clutch will disengage itself from the actuating mechanism at the end of a variably predetermined period causing the machine to cease operation, means for withdrawing the locking means independently of the clutch and means for disengaging the clutch from the actuating mechanism at will during the operation of the machine.

32. In a machine of the character set forth, the combination with a transverse feeding mechanism and an advance feeding mechanism for the sheet, of locking means for the feeding mechanisms adapted to act after each step of the said feeding mechanisms, actuating mechanism controlling the feeding mechanisms, and locking means, a clutch controlling the said actuating mechanism, a lever controlling the clutch and locking means adapted when in its central position to throw the clutch out of engagement with the actuating mechanism, when moved in one direction from its central position to throw the clutch into engagement with the actuating mechanism, and when moved in the opposite direction from its central position to unlock the locking means independent of the clutch.

33. In a machine of the character set forth, the combination with a die of a transverse feeding mechanism and an advance feeding mechanism for the sheet, locking means for the feeding mechanisms adapted to act after each step of the said feeding mechanisms, actuating mechanism controlling the die, feeding mechanisms and locking means, a clutch controlling said actuating mechanism, a lever controlling the clutch and locking means adapted when in its central position to throw the clutch out of engagement with the actuating mechanism, when moved in one direction from its central position to throw the clutch into engagement with the actuating mechanism, and when moved in the opposite direction from its central position to unlock the locking means independently of the clutch.

34. In a machine of the character set forth, the combination with a transverse feeding mechanism and an advance feeding mechanism for the sheet, of locking means for the feeding mechanisms adapted to act after each step of the said feeding mechanisms, front gages for the sheet, actuating mechanism controlling the feeding mechanisms, and locking means, a clutch controlling the clutch and locking means adapted when in its central position to throw the clutch out of engagement with the actuating mechanism, when moved in one direction from its central position to throw the clutch into engagement with the actuating mechanism and to withdraw the front gages, and when moved in the opposite direction from its central position to unlock the locking means independently of the clutch.

35. In a machine of the character set forth, the combination with a die of a transverse feeding mechanism and an advance feeding mechanism for the sheet, locking means for the feeding mechanisms adapted to act after each step of the said feeding mechanisms, front gages for the sheet, actuating mechanism controlling the die, feeding mechanisms and locking means, a clutch controlling the said actuating mechanism, a lever controlling the clutch and locking means adapted when in its central position to throw the clutch out of engagement with the actuating mechanism, and to withdraw the front gages when moved in one direction from its central position to throw the clutch into engagement with the actuating mechanism and when moved in the opposite direction from its central position to unlock the locking means independently of the clutch.

36. In a machine of the character set forth, the combination with a transverse feeding mechanism and an advance feeding mechanism for the sheet, of locking means for the feeding mechanisms adapted to lock the said feeding mechanisms after each step, actuating mechanism controlling the feeding mechanisms and locking means, a clutch controlling the said actuating mechanism, a lever controlling the clutch, connections independent of the actuating mechanism for the locking-pins, the lever and parts being so arranged when the lever is in its central position, as to throw the clutch out of engagement with the actuating mechanism, when moved in one direction from its central longitudinal position to throw the clutch into engagement with the actuating mechanism, and when moved in the opposite direction from its central position to unlock the locking means independently of the clutch.

37. In a machine of the character set forth, the combination with a die, of a transverse feeding mechanism and an advance feeding mechanism for the sheet, locking means for the feeding mechanisms adapted to lock the said feeding mechanisms in the position to which they have been moved after each step, actuating mechanism controlling the die, feeding mechanisms, and locking means, a clutch controlling the said actuating mechanism, a lever controlling the clutch, connections independent of the actuating mechanism from the locking means to the lever, the parts being so arranged, when the lever is in its central position, as to throw the clutch out of engagement with the actuating mechanism when moved in one direction from its central position to throw the clutch into engagement with the actuating mechanism, and when moved in the opposite direction from its central position to unlock the locking means independently of the clutch.

38. In a machine of the character set forth, the combination with a transverse feeding mechanism and an advance feeding mechanism for the sheet, of locking means for the feeding mechanisms adapted to lock the said feeding mechanisms after each step, front gages for the sheet, actuating mechanism controlling the feeding mechanisms and locking means, a clutch controlling the said actuating mechanism, a lever controlling the clutch, connections independent of the actuating mechanism for the locking-pins, the lever and parts being so arranged when the lever is in its central position, as to throw the clutch out of engagement with the actuating mechanism, and to withdraw the front gages, when moved in one direction from its central longitudinal position to throw the clutch into engagement with the actuating mechanism, and when moved in the opposite direction from its central position to unlock the locking means independently of the clutch.

39. In a machine of the character set forth, the combination with a die, of a transverse feeding mechanism and an advance feeding mechanism for the sheet, locking means for the feeding mechanisms adapted to lock the said feeding mechanisms in the position to which they have been moved after each step, front gages for the sheet, actuating mechanism controlling the die, feeding mechanisms, and locking means, a clutch controlling the said actuating mechanism, connections independent of the actuating mechanism, a lever controlling the clutch, connections independent of the actuating mechanism from the locking means to the lever, the parts being so arranged, when the lever is in its central position, as to throw the clutch out of engagement with the actuating mechanism, and to withdraw the front gages, when moved in one direction from its central position to throw the clutch into engagement with the actuating mechanism, and when moved in the opposite direction from its central position to unlock the locking means independent of the clutch.

40. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same and adapted to mesh with the intermediate gear, two straight ratchets carried by the reciprocating member, two pawls adapted alternately to engage and disengage with the ratchets to impart motion to the same in opposite directions, and means for operating said pawls.

41. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same and adapted to mesh with the intermediate gear, two straight ratchets carried by the reciprocating member, two pawls adapted alternately to engage and disengage with the ratchets to impart motion to the same in opposite directions, and means for operating said pawls, the ratchets being so positioned that the initial stroke in each direction is equal to but half the length of the succeeding strokes.

42. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same, and adapted to mesh with the intermediate gear, two straight ratchets carried by the reciprocating member, two pawls adapted alternately to engage and disengage with the ratchets to impart motion to the same in opposite directions, and means for operating said pawls.

43. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same, and adapted to mesh with the intermediate gear, two straight ratchets carried by the reciprocating member, two pawls adapted to alternately engage and disengage with the ratchets to impart motion to the same in opposite directions, and means for operating said pawls, the ratchets being so positioned that the initial stroke in each direction is equal to but half the length of the succeeding strokes.

44. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same and adapted to mesh with the intermediate gear, two straight ratchets carried by the reciprocating member, two pawls adapted alternately to engage and disengage with the ratchets aforesaid to impart motion to the same in opposite directions, means for operating said pawls, springs for normally and alternately holding said pawls in engagement with the ratchets, and means for alternately disengaging said pawls from the ratchets aforesaid when the reciprocating member has reached the limit of its movement in either direction.

45. In a machine of the character set forth, the combination of a forwardly-moving carriage, a transversely-moving carriage mounted upon the latter, a centrally-disposed and longitudinally-extending intermediate gear stationarily located, a transverse rack carried by the transversely-moving carriage, a pinion mounted on the forwardly-moving carriage and adapted to transfer the motion of the intermediate gear to the transverse rack, a reciprocating member, a rack carried by the same and adapted to mesh with the intermediate gear, two straight ratchets carried by the reciprocating member, two pawls adapted alternately to engage and disengage with the ratchets aforesaid to impart motion to the same in opposite directions, means for operating said pawls, springs for normally and alternately holding said pawls in engagement with the ratchets, and means for alternately disengaging said pawls from the ratchets aforesaid when the reciprocating member has reached the limit of its movement in either direction, the ratchets being so positioned that the initial stroke in either direction is equal to but half the length of the succeeding strokes.

46. In a machine of the character set forth, the combination with a movable carriage, of a ratchet adapted to impart motion to the movable carriage, a pawl for operating the ratchet, a pawl-lifter adapted to move said pawl into and out of engagement with the ratchet aforesaid, and adapted normally to be in its uppermost position with the pawl out of contact with the ratchet, means and a normally broken connection for automatically moving the pawl-lifter down so as to allow the pawl to engage with the ratchet, and means for periodically causing the broken connection to form an unbroken connection between the aforesaid means and the pawl-lifter thus controlling the periods at which the pawl-lifter operates.

47. In a machine of the character set forth, the combination with a movable carriage, of a ratchet adapted to impart motion to the movable carriage, a pawl for operating the ratchet, a pawl-lifter adapted to move said pawl into and out of engagement with the ratchet aforesaid, and adapted normally to be in its uppermost position with the pawl out of contact with the ratchet, means for automatically moving the pawl-lifter down so as to allow the pawl to engage with the ratchet, comprising: a bell-crank connected with the said pawl-lifter at one end and carrying a pin at its other end, a second bell-crank, means for rocking the said second bell-crank, a hooked lever carried by the said bell-crank and adapted to engage and disengage with the pin on the first-mentioned bell-crank, and means for lifting the hooked lever into engagement with the pin on the first-mentioned bell-crank.

48. In a machine of the character set forth, the combination with a forwardly-moving carriage, and a transversely-moving carriage with means for operating the latter, of a ratchet adapted to impart motion to the forwardly-moving carriage, a pawl for operating the ratchet, a pawl-lifter adapted to move the said pawl into and out of engagement with the ratchet aforesaid, and adapted normally to be in its uppermost position and to hold the pawl out of engagement with the ratchet, means and connections for automatically moving the pawl-lifter down so as to allow the pawl to engage with the ratchet, and means operated when the transversely-moving carriage comes to the end of its stroke in either direction for controlling the periods at which the means and connections will operate the pawl-lifter.

49. In a machine of the character set forth, the combination with a forwardly-moving carriage, and a transversely-moving carriage with means for operating the latter, of a ratchet adapted to impart motion to the forwardly-moving carriage, a pawl for operating the ratchet, a pawl-lifter adapted to move the said pawl into and out of engagement with the ratchet aforesaid, and adapted normally to be in its uppermost position and to hold the pawl out of engagement with the ratchet, means and a normally broken connection for automatically moving the pawl-lifter down so as to allow the pawl to engage with the ratchet, and means operated when the transversely-moving carriage comes to the end of its stroke causing the broken connection to form an unbroken connection between the aforesaid means and the pawl-lifter thus controlling the period at which the pawl-lifter operates.

50. In a machine of the character set forth, the combination with a forwardly-moving carriage, and a transversely-moving carriage with means for operating the latter, of a ratchet adapted to impart motion to the forwardly-moving carriage, a pawl for operating the ratchet, a pawl-lifter adapted to move the said pawl into and out of engagement with the ratchet aforesaid, and adapted normally to be in its uppermost position and to hold the pawl out of engagement with the ratchet, means for automatically moving the pawl-lifter down so as to allow the pawl to engage with the ratchet comprising: a bell-crank connected with the said pawl-lifter at one end and carrying a pin at the other end, a second bell-crank, means for rocking the said bell-crank, a hooked lever carried by the said second bell-crank and adapted to engage and disengage with the pin on the first-mentioned bell-crank, and means operated when the transversely-moving carriage comes to the end of its stroke in either direction for lifting the hooked lever into engagement with the pin on the first-mentioned bell-crank.

51. In a machine of the character set forth, the combination with actuating means, of a clutch controlling the actuating means, a forwardly-moving carriage and a transversely-moving carriage receiving their motion from the actuating means, a starting-lever, connections from the said starting-lever to the clutch to start and stop the actuating mechanism comprising in part: a hooked lever and means with which the said hooked lever engages and disengages, means for lifting the said lever out of contact with its engaging means to stop the machine, a spring-seated rod, a collar on the said rod, means carried by the forwardly-moving carriage for engaging with the said collar to move the rod for operating the lifting means for the hooked lever adapted to come in juxtaposition with the said collar when the forwardly-moving carriage has reached the limit of its movement in a forward direction and adapted to be operated by the transversely-moving carriage when the latter comes to the end of its movement in one direction after the said forwardly-moving carriage has reached the limit of its movement in a forward direction.

52. In a machine of the character set forth, the combination with actuating means, of a clutch controlling the actuating means, a forwardly-moving carriage and a transversely-moving carriage receiving their motion from the actuating means, a starting-lever, connections from the said starting-lever to the clutch to start and stop the actuating mechanism, comprising: a bell-crank connected with the clutch at one end and having a pin at its other end, a hooked lever connected with the starting-lever and adapted to engage and disengage with the pin on the bell-crank, a second bell-crank for lifting the hooked lever out of contact with the pin on the first-mentioned bell-crank, a spring-seated rod connected with the said second bell-crank, a collar on the said spring-seated rod, means carried by the forwardly-moving carriage for engaging with the said collar to move the rod connected with the second bell-crank adapted to come in juxtaposition with the said collar when the forwardly-moving carriage has reached the limit of its movement in a forward direction and adapted to be operated by the transversely-moving carriage when the latter comes to the end of its movement in one direction after the said forwardly-moving carriage has reached the limit of its movement in a forward direction.

53. In a machine of the character set forth, the combination with a feed-table, and a sheet-feeding device, of a pivoted front gage, operating mechanism for the sheet-feeding device, a starting-lever, and a bell-crank connected to the said front gage at one end and to the starting-lever at its other end.

54. In a machine of the character set forth, the combination with a die, of a punch, two spring-seated pins in the die for moving the blank out of the die and holding it against the punch as the latter ascends, cam-actuated means for withdrawing the said pins after the punch has left the die, a stripping mechanism adapted to come in position under the punch when the latter has ascended, and a cam-actuated knock-out in the punch adapted to move the blank out of the punch and onto the stripping mechanism.

55. In a machine of the character set forth, the combination of two slides, one of which is provided with an aperture, two extractor-fingers carried by the other of the said slides having means extending into the aperture aforesaid, and means for operating said slides, the arrangement being such that one of the slides moves ahead in advance of the other slide so that the extractor-fingers are closed as the slides advance and opened as the slides recede.

56. In a machine of the character set forth, the combination with a movable carriage, of a locking-pin, a shaft carrying the same adapted to travel with the movable carriage, a stationarily-located shaft extending at right angles to the shaft carrying the locking-pin, and means for imparting the motion of the stationarily-located shaft to the traveling shaft adapted to travel with the said traveling shaft over the stationarily-located shaft.

57. In a machine of the character set forth, the combination with a forwardly-moving carriage, of a locking-pin, a transversely-extending shaft carrying the said pin adapted to travel with the said forwardly-moving carriage, a stationarily-located shaft extending longitudinally, and means for imparting the motion of the longitudinal shaft to the transverse traveling shaft adapted to travel with the said traveling shaft over the stationarily-located shaft.

58. In a machine of the character set forth, a sheet-gripping device comprising: a pair of jaws, a plurality of pivoted bell-cranks supporting one of said jaws, a rock-shaft, a plurality of crank-levers mounted on the said rock-shaft, and links connecting said crank-levers and bell-cranks.

59. In a machine of the character set forth, a sheet-gripping device comprising: two jaws, one of which is stationary, a plurality of pivoted bell-cranks supporting the other of said jaws, a rock-shaft, a plurality of crank-levers mounted on the said rock-shaft, and links connecting said crank-levers and bell-cranks.

60. In a machine of the character set forth, a sheet-gripping device comprising: two jaws, the lower one of which is stationary, pivoted bell-cranks supporting the upper one of the said jaws, a rock-shaft, a plurality of crank-levers mounted on the said rock-shaft, and links connecting said crank-levers and bell-cranks.

Signed at New York, borough of Brooklyn, New York, this 23d day of September, 1903.

OTTO S. BEYER.

Witnesses:
  MOSES ARONSON.
  W. B. BAILEY.